United States Patent
Youn et al.

(10) Patent No.: US 6,369,538 B1
(45) Date of Patent: Apr. 9, 2002

(54) METHOD FOR BRAKING A WASHING MACHINE

(75) Inventors: Sang Chul Youn, Kyunggi-do; Joo Hwan Lee; Chul Woong Lee, both of Seoul; In Hwan Ra, Kyunggi-do, all of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/612,915

(22) Filed: Jul. 10, 2000

(30) Foreign Application Priority Data

Oct. 12, 1999 (KR) .............................................. 99-44144

(51) Int. Cl.⁷ ......................... H02K 23/00; D06F 33/02
(52) U.S. Cl. ...................... 318/362; 318/437; 68/12.02; 68/12.04
(58) Field of Search ................................ 318/361–380, 318/254, 138, 778, 437; 68/12.02, 12.12, 12.16, 12.04, 12.14, 23.7; 8/159

(56) References Cited

U.S. PATENT DOCUMENTS

| | | | | |
|---|---|---|---|---|
| 5,325,677 A | * | 7/1994 | Payne et al. | |
| 5,647,232 A | * | 7/1997 | Boldt et al. | |
| 5,778,703 A | * | 7/1998 | Imai et al. | |
| 5,913,952 A | * | 6/1999 | Kim | |
| 5,979,194 A | * | 11/1999 | Matsumoto et al. | |
| 6,014,004 A | * | 1/2000 | Hamaoka et al. | |
| 6,041,625 A | * | 3/2000 | Nagai et al. | |
| 6,060,851 A | * | 5/2000 | Imai et al. | |

FOREIGN PATENT DOCUMENTS

JP          P2001-46782 A   *   2/2001

* cited by examiner

*Primary Examiner*—Paul Ip
(74) *Attorney, Agent, or Firm*—Fleshner & Kim, LLP

(57) ABSTRACT

This invention relates to a method for braking a washing machine comprising the steps of: determining whether or not a motor is braking; transmitting a PWM (Pulse Width Modulation) control signal by setting up the initial phase and the duty ratio according to the voltage flows in the system when an operation mode determined by the previous step as a braking mode; comparing a capacity and a variance of the detected voltage with a reference voltage predetermined during the previous step; and controlling a motor driver by re-establishing the control phase and the duty ratio are re-established until the motor is stopped when the comparison result of the previous step indicates that the capacity and the variance of the voltage are lower than the predetermined reference level.

15 Claims, 4 Drawing Sheets

METHOD FOR BRAKING A WASHING MACHINE

BACKGROUND OF THE INVENTION

1. Field of the Invention

The present invention relates to a method for braking a washing machine. More particularly, the present invention relates to a method for braking a washing machine by controlling a revival voltage in a motor braking system by adjusting a pulse phase and a pulse duty ratio when a revival voltage is at or below a predetermined level, and using a minimum capacity dynamic braking resistor when a revival voltage reaches over a predetermined level.

2. Description of the Related Art

Referring to FIG. 1, a conventional braking system for a washing machine comprises: a rectifier 101 which converts the AC power of the system to the DC voltage; a capacitor filter 102 which smoothes the rectified DC voltage; a motor driver 103 which drives a motor by using a smoothed DC voltage; a voltage detector 104 for detecting a voltage of the system when a motor M is suddenly braked; a voltage comparator 105 for comparing a detected voltage of the voltage detector 104 and a reference voltage pre-set in the system; a switch element 106 for determining on/off status of the dynamic brake resistor R1 according to the comparison result of the voltage comparator 105; a sensor 107 for detecting a revolution position and the speed of a motor M; a microcomputer 108 for controlling an overall operation to resolve the over-voltage in the system; and a signal output device 109 for generating a control signal according to the control of the microcomputer 108.

The dynamic braking resistor R1 converts the revival voltage into thermal energy to protect the system when the inertia energy of the motor or the load transforms into electric energy causing the level of the revival voltage charged in a capacitor filter 102 to increase.

The overall operation of the conventional braking system for a washing machine as described above is illustrated hereinafter with reference to FIG. 1.

Firstly, the rectifier 101 converts the commercial AC power supplied from the outer power source to the DC voltage, and then the DC voltage is smoothed by the capacitor filter 102 before being supplied to a motor driver 103.

The washing machine is operated as the motor driver 103 and converts the DC voltage smoothed by the capacitor filter 102 to drive the motor M.

However, in the event that a lid of the washing machine is opened during a dehydrating process or an unbalance state of the tub is detected, the rapidly rotating motor M must be braked quickly in order to make sudden stop of the tub.

Since the motor M is a brushless DC motor and it becomes the load during the normal washing operation, current flows in a discharging direction from the capacitor filter 102 to the motor M.

However, when the rapidly rotating motor M is suddenly braked, the motor M becomes a power generator and current flows in a charged direction, from the motor M to the capacitor filter 102, due to the induction electromotive power generated from the motor M causes increase in the voltage level of the capacitor filter 102.

If the revival voltage charged in the capacitor filter 102 is not discharged, then the voltage level exceeds the inner voltage of the designed circuit thereby damaging the peripheral circuit and the device.

Therefore, the voltage detector 104, the voltage comparator 105 and the dynamic braking resistor R1 are provided in order to discharge the over-flown voltage in the system during braking of the motor M.

In the event that the motor M is braked while washing or dehydration process, the voltage detector 104 measures the voltage between the capacitor filter 102 and the motor M thereof, and delivers the detected voltage measurement to the voltage comparator 105.

The voltage comparator 105 then compares the reference voltage Vref and the detected voltage Vdc delivered from the voltage detector 104, and sends the result of comparison to the switching element 106. The switching element 106 operates on/off control functions based on the compared result sent from the voltage comparator 105.

If it is determined that the detected voltage Vdc exceeds the reference voltage Vref, then the dynamic braking resistor R1 is activated as the switch is turned to on state through a power output from the voltage comparator 105.

As a result, the over-flown voltage between the capacitor filter 102 and the motor M flows to the dynamic braking resistor R1 instead of capacitor filter 102, thereby the system is sustained at the regular voltage-level as the over-flown voltage is discharged into thermal energy.

If the detected voltage Vdc between the capacitor filter 102 and the motor M is lower than the reference voltage Vref level, then the dynamic braking resistor R1 is turned off by the switching element 106 during the discharge process of the over-voltage. Then, the motor M operates as the current flows only to the capacitor filter 102, and not to the dynamic braking resistor R1.

However, when the motor M decelerates quickly or the load inertia of the motor M is massive, the revival energy generated in the motor M becomes more massive. As a result, the revival energy is revived to the motor driver 103, and the voltage charged to the capacitor filter 102 increases. And, when the DC voltage reaches over 380V, the dynamic braking resistor R1 is turned on to discharged the revival energy into thermal energy.

However, one of the disadvantages of the conventional method is that the detected voltage is compared only with one reference level, and the switching element 106 is operated to start the dynamic braking resistor R1 only in the event that the detected voltage exceeds the reference level which results in difficulty in dealing appropriately with the revival voltage according to the motor braking, and also the problem of the motor not being operated rapidly or smoothly.

Another disadvantage of the conventional method is that the size and the capacity of the dynamic braking resistor R1 installed on the outer part of the system is large making the system more complicated and increase the cost of the system.

SUMMARY OF THE INVENTION

Accordingly, it is an object present invention to provide a method for rapidly and smoothly braking a washing machine by treating a revival voltage of the motor braking with hardware and software.

Another object of this invention is to reduce the size and capacity of a dynamic braking resistor in order to reduce the system capacity and the cost.

These and other objects are satisfied by a method for braking a washing machine comprising the steps of: determining whether or not a motor is braking; transmitting a PWM (Pulse Width Modulation) control signal by setting up the initial phase and the duty ratio according to the voltage flows in the system when an operation mode determined by the previous step as a braking mode; comparing a capacity and a variance of the detected voltage with a reference voltage predetermined by the previous step; and controlling a motor driver by re-establishing the control phase and the duty ratio until the motor is stopped when the comparison result of the previous step indicates that the capacity and the variance of the voltage are lower than the predetermined reference level.

DETAILED DESCRIPTION OF THE INVENTION

A preferred embodiment of a method for braking a washing machine according to the present invention will be described more fully hereinafter with reference to the accompanying drawings.

Figure 1:
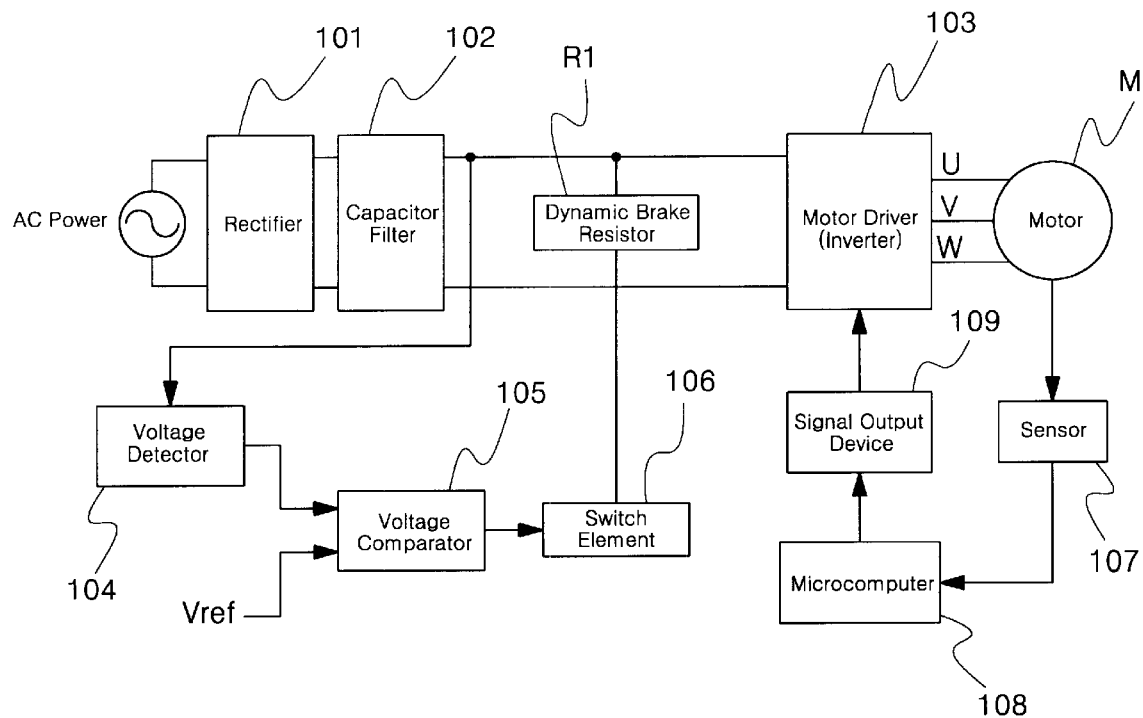
FIG. 1 is a block diagram of the braking system of the conventional inverter washing machine.
Figure 2:
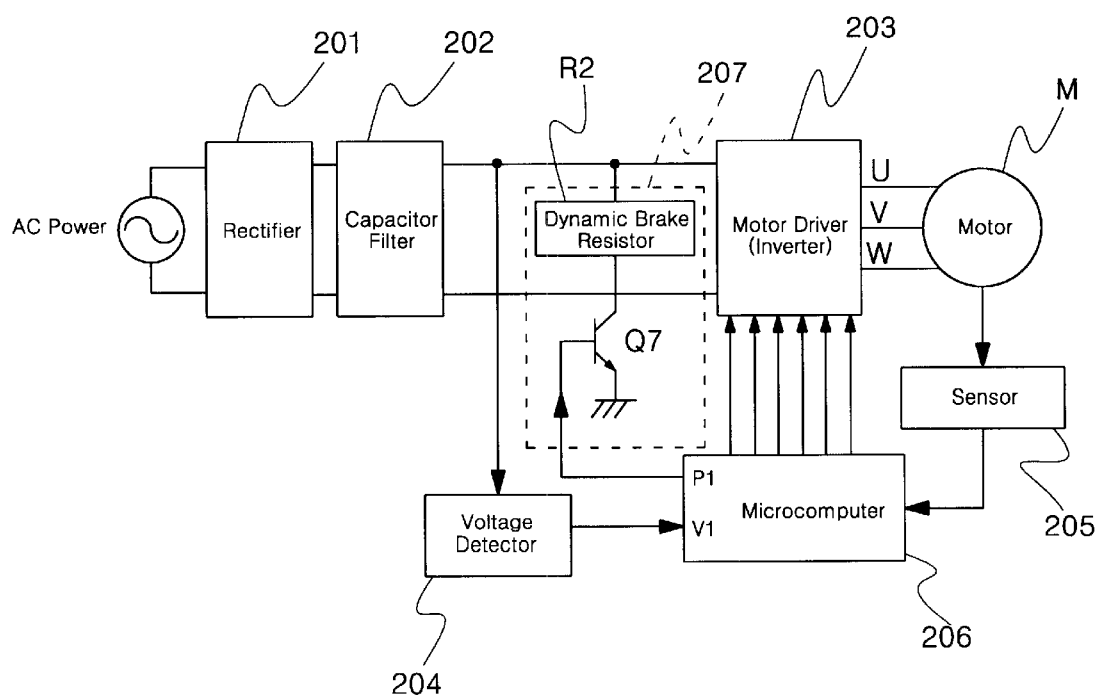
FIG. 2 is a block diagram of the braking system of the inverter washing machine in accordance with the present invention.
Figure 3:
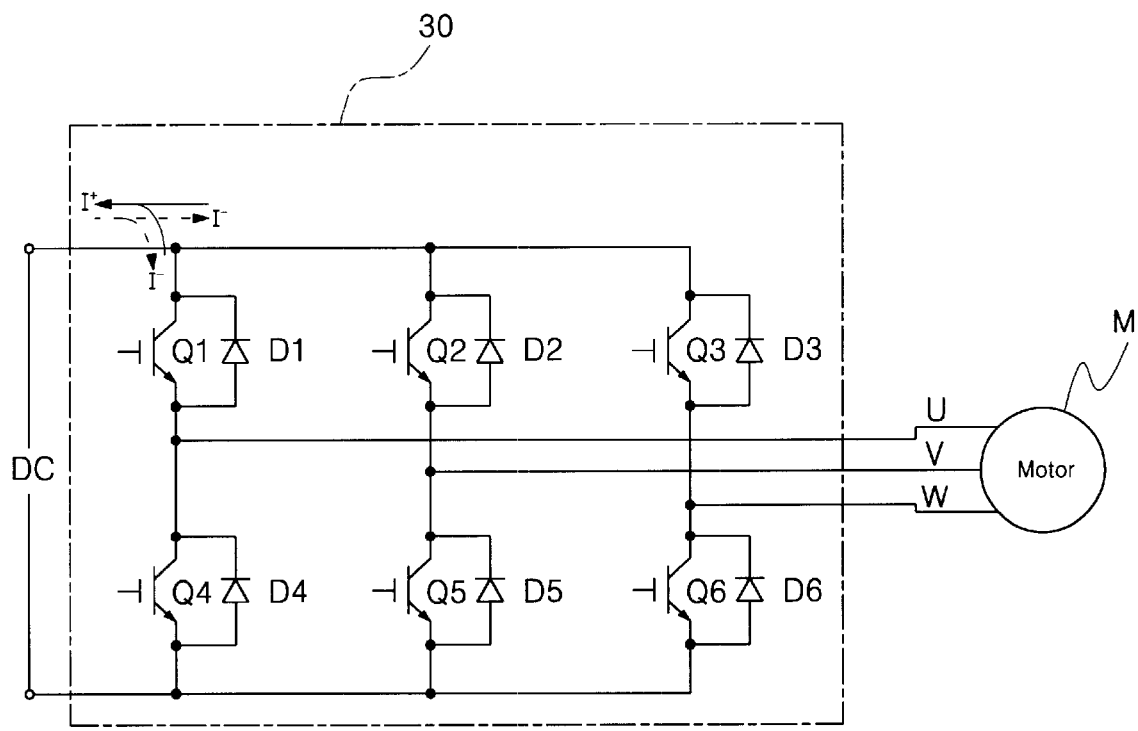
FIG. 3 is a sectional block diagram of the motor driver and the motor in accordance with the present invention.

FIG. 2 is a block diagram illustrating a braking system of the inverter washing machine in accordance with the present invention, and FIG. 3 is a sectional block diagram showing a motor driver and a motor.

Referring to FIG. 2 and FIG. 3, a braking element of the inverter washing machine accordance with the present invention comprises: a rectifier 201 for rectifying an AC power of the system to a DC voltage; a capacitor filter 202 for smoothing a rectified DC voltage; a motor driver 203 for driving the motor M by converting the smoothed DC voltage into a three-phase voltage and frequency; a voltage detector for 204 detecting the smoothed DC voltage in real time; a sensor 205 for detecting the phase differences and the rotation speed of the motor M in real time; a microcomputer 206 for transmitting a control signal to the motor driver 203 based on a predetermined phase and a duty ratio according to the detected voltage in the motor M speed and the voltage detector 204; and an emergency braking device 207 for exhausting the revival voltage by using the control of the microcomputer 206 in case of the emergency braking of the motor M.

The motor driver 203, referring to FIG. 3, comprises, a plurality of high-speed switching devices Q1 to Q6 and a free wheeling diode D1 to D6 connected in reverse parallel to the switching device Q1 to Q6.

In the motor driver 203, the switching devices Q1, Q2 and Q3 connected to the high-voltage are paired with the switching devices Q4, Q5 and Q6 connected to the low-voltage, respectively to supply the AC voltage to each phase U, V and W of the motor M.

The emergence-braking element 207 consists a switching device Q7 which the on/off switch functions are determined by the control signal sent from the microcomputer 206, and a dynamic braking resistor R2 to discharge the revival voltage by converting into thermal energy in the event that the switch is on state.

The preferred embodiment of the present invention will be described hereinafter with reference to relevant drawings.

Referring to FIG. 2 and FIG. 3, when a commercial AC electric power with an uniform frequency and an uniform width, such as 200V/60 Hz electric power, generally used in a home, a commercial area and an industry flows in from the outer power source, the AC electric power is rectified to the DC voltage by the rectifier 201 which is then stably smoothed by the capacitor filter 202 before being supplied to the motor driver 203.

The motor driver 203 drives the motor M by using three-phase AC voltage U, V and W and the frequency through a high-speed switching with a plurality of switching devices Q1 to Q6 in order to arbitrarily control the voltage or the current capacity and the frequency supplied to the motor via the capacitor filter 202, thereby a washing process, a rinsing process and dehydration process are performed.

The switching device Q1 to Q6 is a high-speed switching device such as IGBT (Insulated Gate Bipolar Transistor). And, the switching device Q1~Q6 is composed of the high-voltage section individually paired with corresponding low-voltage sections Q1 and Q4, Q2 and Q5, Q3, and Q6, to supply the specified AC voltage to the corresponding phase U, V and W of the motor. And when the switching device Q1 to Q6 at the off status, the revival current (I+) flows through the diode D1~D6 connected in reverse parallel to the switching device Q1~Q6.

And, in the voltage detector 204, detects the smoothed DC voltage in real time, and the detected voltage is outputted to the microcomputer 206. The sensor 205 detects the rotational speed based on the rotator position in each phase U, V, W of the motor M and the information on the phase differences. And then, the detected rotational speed is outputted to the microcomputer 206.

And, in the microcomputer 206 compares the detected voltage $V_{DC}$ inputted from the voltage detector 204 and the detected rotational speed sent from the sensor 205 with the pre-programmed desired speed. Then the result of the comparison is used to control the switching device Q1 to Q6 of the motor driver 203 so that the motor speed reaches a desired speed.

The signal transferred to the motor driver 203 from the microcomputer 206 is a PWM (Pulse Width Modulation) control signal which controls the on/off functions of each switching device Q1 to Q6 of the motor driver 203 and the diode D1 to D6 connected in the reverse parallel to the switching device, thereby the width of the output pulse is transformed in order for the current flown in the motor M becomes an approximate sine wave.

In the event that a lid of a washing machine is opened during the dehydration process or the unbalance state of the tub is detected, the microcomputer 206 immediately brakes the rapidly rotating motor M to make a sudden stop of the tub. When the motor M makes such sudden stop, the motor M acts as the induction motor as the motor is decelerated by the motor driver 203, and the revival voltage flows to the motor driver 203. The revival voltage is then charged to the capacitor filter 202 which cause the voltage level to increase.

And, the microcomputer 206 detects the voltage $V_{DC}$ between the capacitor filter 202 and the motor driver 203 through the voltage detector 204 to set up the initial phase and the duty ratio, and then the PWM control signal is outputted to the motor driver 203. As a result, the logical charge-discharge loop between each phase voltage U, V and W of the motor M and the capacitor filter 202 is established, and the phase and the duty ratio get to be varied. Thereafter, the capacity and the variant width of the voltage $V_{DC}$ detected in real time by the voltage detector 204 is compared with the predetermined inner reference level Vref, ΔV to determine the operation of the emergence braking device.

If the capacity and the variant width of the detected voltage $V_{DC}$ is lower than the referenced level, then only the control phase and the duty ratio are re-set and the PWM control signal is outputted to the motor driver 203 to run the motor M.

In other words, if the voltage revived from the motor M does not exceed the predetermined inner level or the variant width of the voltage is minimal, then the motor M is driven as the phase and the duty ration are adjusted to the revival voltage.

On the other hand, in the event that the size or the variant width of the voltage $V_{DC}$ detected by the voltage detector 204 exceeds the predetermined inner reference level, the microcomputer 206 then recognizes the condition as the emergence braking mode and the switching device Q7 of the emergence-braking device 207 is turned to on state. Then the dynamic braking resistor R2 connected to the collector exhausts the revival voltage by converting it to the thermal energy.

Figure 4:
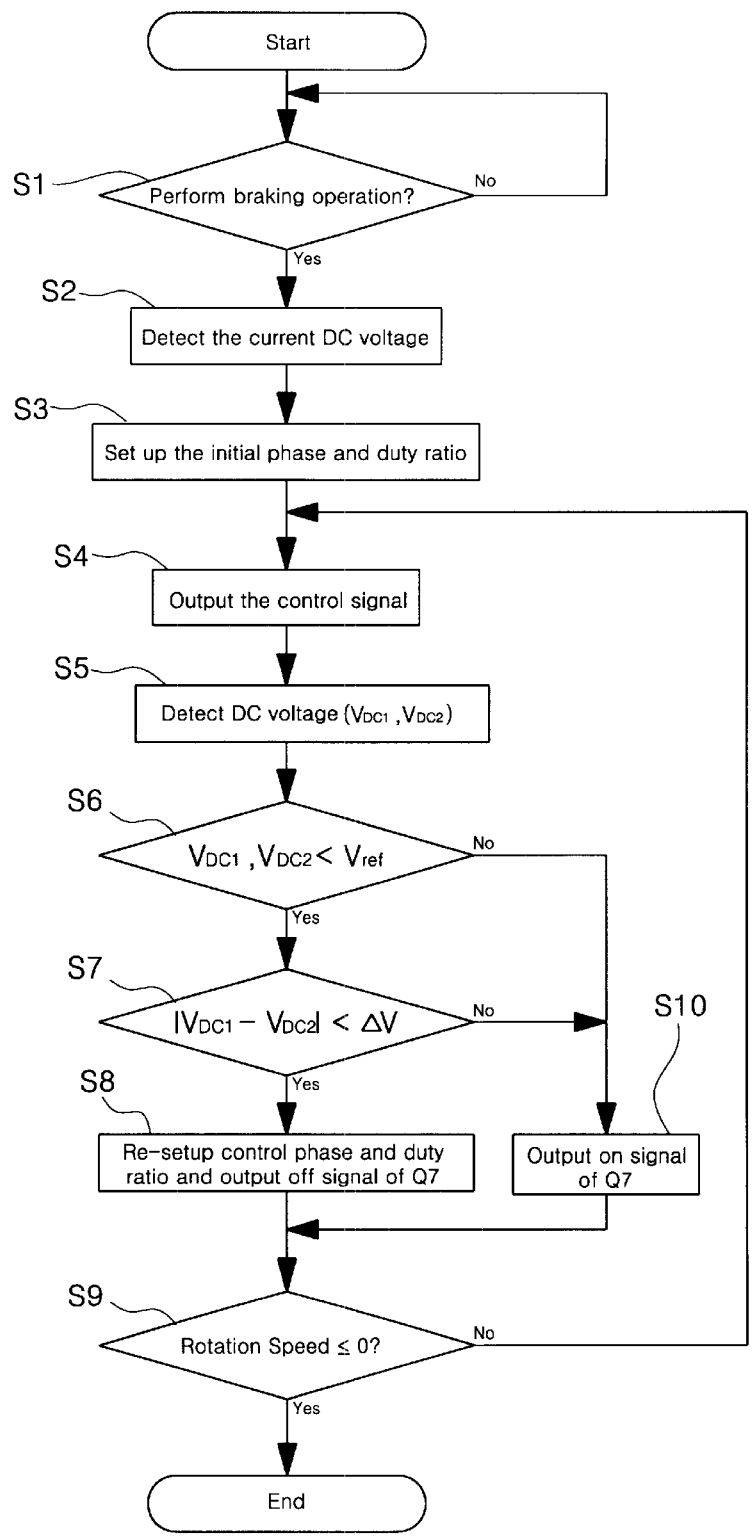
FIG. 4 is a flowchart for implementing a method for braking an inverter washing machine in accordance with the present invention.

FIG. 4 is a flowchart of a method for the braking a washing machine accordance with the present invention.

Referring to FIG. 4, if it is determined that braking of the washing machine has been occurred, the microcomputer receives the voltage detected from the voltage detector 204 and the rotation speed detected from the senor 205 to set up the corresponding initial phase and duty ratio. And, based on this phase and duty ratio, the PWM control signal is outputted to the motor driver 203 (referring to S1, S2, S3, S4 of FIG. 4).

That is, once the microcomputer 206 detects the DC voltage and the rotation speed, the corresponding initial phase and duty ratio are set up and the diode D1 to D6 connect in parallel to each switching device Q1 to Q6 of the motor driver 203 is selectively turned on or off, thereby the logical loop corresponding to the charge (I+) and the discharge (I−) of the revival voltage for each phase U, V, W of the motor M are established.

Figure 5:
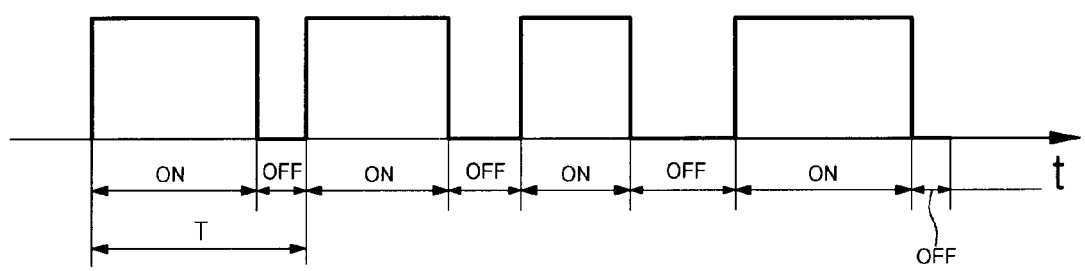
FIG. 5 is a wave diagram illustrating the duty ratio of the PWM signal in accordance with the present invention.
Figure 6:
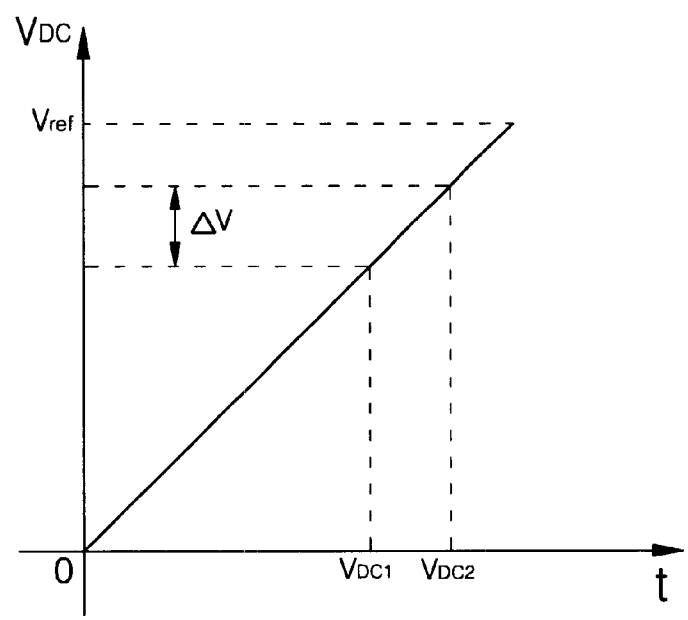
FIG. 6 is a wave diagram of an example revival voltage during the motor braking in accordance with the present invention.

FIG. 5 is a wave diagram of a PWM duty ratio for the present invention. Referring to $$Dratio = \frac{Ton}{Ton + Toff}$$

FIG. 5, the PWM duty ratio is described through following mathematical equation.

Where, Ton is a time of switch-on interval of the switching device Q1 to Q6, and Toff is a time of switch-off interval of the switching device Q1 to Q6. Since the denominator of the duty ratio is a fixed value, the duty ratio is determined by the value of Ton.

Accordingly, as the duty ratio increase the value of the Ton also increase, which means increase in the charge capacity of the revival voltage of the motor M and decrease in the charge capacity of the capacitor filter 202. On the contrary, if value of the duty ratio means is small then the value of the Ton is also small meaning that decrease in the charge capacity of the revival voltage of the motor M make and increase in the charge capacity of the capacitor filter 202.

And then, the voltage $V_{DC1}$, $V_{DC2}$ detected in real time by the voltage detector 204 (step S5) is compared with the predetermined inner reference voltage Vref, to determine whether to perform the normal braking operation or the emergence braking operation (referring to S5, S6 of FIG. 4). If the detected voltage $V_{DC1}$, $V_{DC2}$ is lower than the inner reference voltage Vref, the variance width of the voltage ($|V_{DC1}-V_{DC2}|$) is compared to the inner threshold voltage ΔV (referring to S7 of FIG. 4).

The variance width of the voltage indicates the sudden increase or decrease of the voltage. Therefore, in order to detect the rising ratio of voltage level, the variance width ($|V_{DC1}-V_{DC2}|$) must be compared with the inner threshold voltage ΔV.

At this time, if the variance width ($|V_{DC1}-V_{DC2}|$) of the voltage is lowed than the inner threshold voltage ΔV, the control phase and the duty ratio are re-set and the control signal corresponding to the control phase and duty ratio is continuously transmitted to the motor driver 203 until the rotation speed of the motor comes to complete stop (referring to S8, S9, S4 FIG. 4).

The process of controlling each switching device Q1~Q6 and diode D1~D6 of the motor driver 203 is repeated as the phase and the duty ratio of the control pulse corresponding to the detected voltage $V_{DC}$ and the speed varies. As a result, the motor M is stopped smoothly.

In the event that the detected voltage $V_{DC1}$, $V_{DC2}$ exceeds the reference voltage Vref, then it is considered as the emergence braking circumstance and the switching device Q7 of the emergence braking device 207 is turned to on state. As the switch is turned on, the revival voltage is discharged in a form of thermo energy by the dynamic braking resistor R2 connected in between the switching device collector and the capacitor filter 202 and motor driver 203 (referring to S6, S10 of FIG. 4).

Then, the rotational speed of the motor M is monitored, and if the motor M detected to be rotating, the step 4 to 10 is repeated.

Furthermore, if the variance width of the voltage ($|V_{DC1}-V_{DC2}|$) exceeds the threshold voltage ΔV, the switching device Q7 of the emergence-braking device 207 is activated and the dynamic braking resistor R2 discharges the revival voltage in the form of the thermal energy (referring to S7, S10 of FIG. 4).

Thereafter, the process of transmitting the control signal corresponds to the voltage and the rotation speed to the motor driver 203 is performed (referring to S9, S4 of FIG. 4) if the motor is detected to be rotating.

And, the capacity and variance width of the voltage revived to the capacitor filter 202 decrease below the inner reference level, the control phase and the duty ratio is re-set, and the switching device Q7 of the emergence braking device 207 is deactivated (referring to S8 of FIG. 4).

Therefore, during the motor braking, if the capacity and variance width of the voltage revived to the capacitor filter 202 is lower than the reference level, then the control phase and the duty ratio of the motor driver 203 get to be varied until the motor M comes stop. And, if the capacity and variance width of the voltage revived to the capacitor filter 202 exceeds the reference level, then the dynamic braking resistor R2 of the emergence braking device 207 discharges the revival voltage in a form of the thermal energy until the it reaches below the reference level.

Also, a timer is used to measure the time it takes for braking a washing machine and the measured time is compensated to the washing operation.

As described above, this present invention, at the time of the motor braking of a washing machine, if the capacity and the width of the voltage revived to the capacitor filter 202 is lower than the fixed level at the time of motor braking of a washing machine, the dynamic braking resistor is not activated, instead the phase and the duty ration of the pulse signal are re-set. Thus, the size and the capacity of the dynamic braking resistor can be minimized and overall cost is lowered since the size of the dynamic braking resistor is reduced. Moreover, the system can be constructed more easily with better outer design.

What is claimed is:

1. A method for braking a washing machine, comprising:

determining whether a motor is braking;

transmitting a (PWM control signal having an initial phase and an initial duty ratio set according to a detected voltage of the motor, when the motor is determined to be braking;

comparing a capacity and a variance width of the detected voltage with a reference voltage; and controlling a motor driver with the PWM control signal based on the initial phase and the initial duty ratio until the motor is stopped, when the capacity and the variance width of the detected voltage are lower than the reference voltage.

2. The method of claim 1, wherein, if the detected voltage capacity exceeds the reference voltage, a dynamic braking resistor discharges a revival voltage generated by the braking motor by converting the revival voltage to thermal energy, until the detected voltage capacity becomes less than the reference voltage.

3. The method of claim 1, wherein, if the detected voltage capacity exceeds the reference voltage, a dynamic braking resistor discharges a revival voltage generated by the braking motor as thermal energy, until the variance width of the detected voltage falls below a variance width of the reference voltage.

4. The method of claim 1, wherein a timer measures a braking time of the motor and compensates a time measured for a clothes washing operation of the clothes washing machine by an amount of time substantially equal to the braking time.

5. A method for braking a washing machine, comprising:

(a) determining whether a motor is braking;

(b) comparing a capacity and a variance width of a detected voltage with a reference level, when the motor is braking; and (c) braking the motor when one of the following conditions exist:

(c1) the capacity and the variance width of the detected voltage are lower than a capacity and a variance width, respectively, of the reference level, and (c2) the capacity and the variance width of the detected voltage exceed or equal the capacity and the variance width, respectively, of the reference level.

6. The method of claim 5, wherein, when the condition of (c1) exists, the motor is braked by controlling a phase and a duty ratio of a control signal applied to the motor, based on the capacity and the variance width of the detected voltage.

7. The method of claim 5, wherein, when the condition of (c2) exists, the motor is braked using a dynamic braking resistor.

8. A method of braking a drive unit, comprising:

braking the drive unit by modulating at least one of a duty cycle and a phase of a drive signal to the drive unit, when the drive unit is decelerating at or above a predetermined rate; and braking the drive unit by engaging a dynamic brake resistor when a first voltage of the drive unit exceeds a reference voltage or a variance width of the first voltage exceeds a reference width.

9. The method of claim 8, wherein the drive signal is a pulse width modulation signal that drives a three-phase alternating current supply to the drive unit, under a control of a processor.

10. The method of claim 8, wherein the phase is modulated in accordance with a rotational position of the drive unit.

11. The method of claim 8, further comprising, after the dynamic brake resistor has been engaged, disengaging the dynamic brake resistor when both the first voltage is equal to or less than the reference voltage and the variance width of the first voltage is equal to or less than the reference width.

12. The method of claim 8, further comprising repeatedly modulating at least one of the duty cycle and the phase of the drive signal, when the drive unit is decelerating at or above a predetermined rate, in accordance with a rotational position of the drive unit and the first voltage.

13. The method of claim 8, wherein the first voltage exceeds the reference voltage when the drive unit decelerates rapidly, generating a back electromagnetic force within the drive unit that charges a filtering capacitor of a power supply for the drive unit.

14. The method of claim 8, wherein the modulation of the control signal causes the drive unit to decelerate faster.

15. The method of claim 8, wherein the duty cycle is modulated in accordance with a rotational speed of the drive unit.

* * * * *